United States Patent

Muthuswamy et al.

(10) Patent No.: US 10,005,131 B2
(45) Date of Patent: Jun. 26, 2018

(54) TRIANGULAR-SHAPED CUTTING INSERT WITH TWELVE CUTTING EDGES AND TOOL HOLDER THEREFOR

(71) Applicant: Kennametal Inc., Latrobe, PA (US)

(72) Inventors: Padmakumar Muthuswamy, Bangalore (IN); Arunachalam Muthuchidambaram, Bangalore (IN); Arvind Mani, Bangalore (IN)

(73) Assignee: KENNAMETAL INC., Latrobe, PA (US)

( * ) Notice: Subject to any disclaimer, the term of this patent is extended or adjusted under 35 U.S.C. 154(b) by 289 days.

(21) Appl. No.: 14/658,294

(22) Filed: Mar. 16, 2015

(65) Prior Publication Data

US 2015/0273590 A1  Oct. 1, 2015

(30) Foreign Application Priority Data

Mar. 25, 2014 (IN) ............................ 1585/CHE/2014

(51) Int. Cl.
  *B23B 27/16* (2006.01)
  *B23B 27/14* (2006.01)
  *B23B 29/04* (2006.01)

(52) U.S. Cl.
  CPC .......... *B23B 27/145* (2013.01); *B23B 29/043* (2013.01); *B23B 27/16* (2013.01);
  (Continued)

(58) Field of Classification Search
  CPC ... B23B 27/145; B23B 27/16; B23B 27/1614; B23B 27/1625; B23B 27/1622;
  (Continued)

(56) References Cited

U.S. PATENT DOCUMENTS 3,487,515 A * 1/1970 Contrucci ............. B23B 27/143
                                                         407/114
3,885,281 A * 5/1975 Stambler ............. B23B 27/1637
                                                         407/114
(Continued)

FOREIGN PATENT DOCUMENTS

CN      103357907 A    10/2013
EP      0162029 A2 * 11/1985 ........... B23B 27/145
(Continued)

OTHER PUBLICATIONS

Description JP 2009-066746 (English translation) obtained at https://worldwide.espacenet.com/ (last visited Jan. 11, 2017).*
(Continued)

*Primary Examiner* — Ryan Rufo
(74) *Attorney, Agent, or Firm* — Ian K. Samways

(57) ABSTRACT

A cutting insert includes a body having three vertices, an upper face, a lower face, and six planar flank faces perpendicular to and joining the upper and lower faces. A cutting edge is formed at an intersection between the upper and lower faces and each of the planar flank faces. A triangular-shaped island surrounds a central axis, A, of the cutting insert and is higher in elevation than the upper and lower faces. A tool holder includes a tool holder body having a generally triangular-shaped insert-receiving pocket with a triangular-shaped recess that is substantially identical in shape to the triangular-shaped island of the cutting insert that interacts with the island to properly locate and prevent rotation of the cutting insert when mounted in the tool holder.

18 Claims, 4 Drawing Sheets

(52) U.S. Cl.
CPC ......... *B23B 27/164* (2013.01); *B23B 27/1614* (2013.01); *B23B 27/1622* (2013.01); *B23B 27/1625* (2013.01); *B23B 27/1644* (2013.01); *B23B 2200/049* (2013.01); *B23B 2200/161* (2013.01); *B23B 2200/168* (2013.01); *B23B 2205/12* (2013.01); *Y10T 407/22* (2015.01); *Y10T 407/23* (2015.01)

(58) Field of Classification Search
CPC .............. B23B 27/1659; B23B 27/164; B23B 27/1644; B23B 27/1651; B23B 27/1666; B23B 27/1677; B23B 2200/048; B23B 2200/049; B23B 2200/0495; B23B 2200/081; B23B 2200/161; B23B 2200/166; B23B 2200/168; B23B 29/043
See application file for complete search history.

(56) References Cited

U.S. PATENT DOCUMENTS

| | | | | |
|---|---|---|---|---|
| 4,056,872 | A * | 11/1977 | Seidel | B23B 27/143 407/114 |
| 4,065,223 | A * | 12/1977 | Nelson | B23B 27/1614 407/114 |
| 4,318,644 | A * | 3/1982 | Seidel | B23B 27/143 407/114 |
| 4,334,808 | A * | 6/1982 | Seidel | B23B 27/143 407/114 |
| 4,344,725 | A * | 8/1982 | Seidel | B23B 27/143 407/114 |
| 4,359,300 | A | 11/1982 | Hazra | |
| 4,411,565 | A * | 10/1983 | Hazra | B23B 27/143 407/114 |
| 5,503,509 | A | 4/1996 | von Haas et al. | |
| 5,607,263 | A * | 3/1997 | Nespeta | B23B 27/007 407/53 |
| 5,682,803 | A * | 11/1997 | Boianjiu | B23B 27/1614 407/101 |
| 5,964,552 | A | 10/1999 | Larsen | |
| 6,527,485 | B1 * | 3/2003 | Little | B23B 27/065 407/24 |
| 7,112,021 | B2 * | 9/2006 | Pantzar | B23B 31/11 279/8 |
| 8,491,231 | B2 * | 7/2013 | Edler | B23B 27/145 407/103 |
| 2002/0131832 | A1 * | 9/2002 | Morsch | B23B 27/045 407/118 |
| 2006/0257216 | A1 * | 11/2006 | Kimura | B23B 27/1644 407/104 |
| 2011/0106105 | A1 * | 5/2011 | Mergenthaler | B23B 27/16 606/138 |
| 2012/0282054 | A1 * | 11/2012 | Jager | B23B 27/145 408/200 |
| 2013/0089381 | A1 * | 4/2013 | Morgulis | B23B 27/04 407/103 |
| 2013/0142581 | A1 * | 6/2013 | Volokh | B23C 5/207 407/114 |
| 2016/0107248 | A1 | 4/2016 | Smycek | |
| 2017/0100777 | A1 | 4/2017 | Lof | |

FOREIGN PATENT DOCUMENTS

| | | | | |
|---|---|---|---|---|
| EP | 1872889 | A1 * | 1/2008 | ............... B23C 5/20 |
| EP | 3153260 | A1 | 4/2017 | |
| GB | 2081142 | A * | 2/1982 | ......... B23B 27/1614 |
| JP | 08-206910 | A * | 8/1996 | ............... B23C 5/10 |
| JP | 2004098185 | | 4/2004 | |
| JP | 2007-075932 | A * | 3/2007 | ............. B23B 27/14 |
| JP | 2009-066746 | A * | 4/2009 | ............. B23B 27/14 |
| WO | WO2008062825 | A1 | 5/2008 | |

OTHER PUBLICATIONS

Description JP 2007-075932 (English translation) obtained at https://worldwide.espacenet.com/ (last visited Jan. 16, 2017).*

* cited by examiner

TRIANGULAR-SHAPED CUTTING INSERT WITH TWELVE CUTTING EDGES AND TOOL HOLDER THEREFOR

CLAIM TO PRIORITY

This application is a National entry application of Indian Application No. 1585/CHE/2014, filed on Mar. 25, 2014, the entire contents of which is incorporated herein by reference.

FIELD OF THE INVENTION

The invention relates, in general, to a cutting insert for turning and, in particular, to a cutting insert with a triangular-shaped island that interacts with a similarly shaped recess in a triangular-shaped insert-receiving pocket of a tool holder for providing proper location and preventing rotation of the cutting insert when mounted in the pocket.

BACKGROUND OF THE INVENTION

Cutting inserts are known in many basic shapes, such as hexagonal, octagonal, pentagonal, triangular, round, rhomboidal and rectangular.

It has long been a problem in the art to properly locate a triangular-shaped cutting insert in the insert-receiving pocket of a tool holder. In addition, it has long been a problem to prevent rotation of a triangular-shaped cutting insert when properly located in the insert-receiving pocket.

SUMMARY OF THE INVENTION

The purpose of the present invention is to provide a triangular-shaped cutting insert that can be properly located in the insert-receiving pocket of a tool holder, while preventing rotation of the cutting insert when mounted in the pocket.

In one aspect, a triangular-shaped cutting insert comprises a body having three vertices, an upper face, a lower face, and six planar flank faces perpendicular to and joining the upper and lower faces; a cutting edge at an intersection between the upper and lower faces and each of the planar flank faces; and a triangular-shaped island surrounding a central axis, A, of the cutting insert, wherein the island is higher in elevation than the upper and lower faces by a distance so as to act as a locating seating surface and anti-rotation feature for the cutting insert.

In another aspect, a combination cutting insert and tool holder comprises a triangular-shaped cutting insert and tool holder. The cutting insert comprises a body having three vertices, an upper face, a lower face, and six planar flank faces perpendicular to and joining the upper and lower faces; a cutting edge at an intersection between the upper and lower faces and each of the planar flank faces; and a triangular-shaped island surrounding a central axis, A, of the cutting insert, wherein the island is higher in elevation than the upper and lower faces by a distance so as to act as a locating seating surface and anti-rotation feature for the cutting insert. The tool holder comprises a tool holder body having an generally triangular-shaped insert-receiving pocket for accommodating the cutting insert. The insert-receiving pocket includes a triangular-shaped recess that is substantially identical in shape to the triangular-shaped island of the cutting insert, wherein the island of the cutting insert interacts with the recess in the insert-receiving pocket of the tool holder to properly locate and prevent rotation of the cutting insert when mounted in the tool holder.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

In the present description of non-limiting embodiments and in the claims, other than in the operating examples or where otherwise indicated, all numbers expressing quantities or characteristics of ingredients and products, processing conditions, and the like are to be understood as being modified in all instances by the term "about". Accordingly, unless indicated to the contrary, any numerical parameters set forth in the following description and the attached claims are approximations that may vary depending upon the desired properties one seeks to obtain in the apparatus and methods according to the present disclosure. At the very least, and not as an attempt to limit the application of the doctrine of equivalents to the scope of the claims, each numerical parameter should at least be construed in light of the number of reported significant digits and by applying ordinary rounding techniques.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

Figure 1:
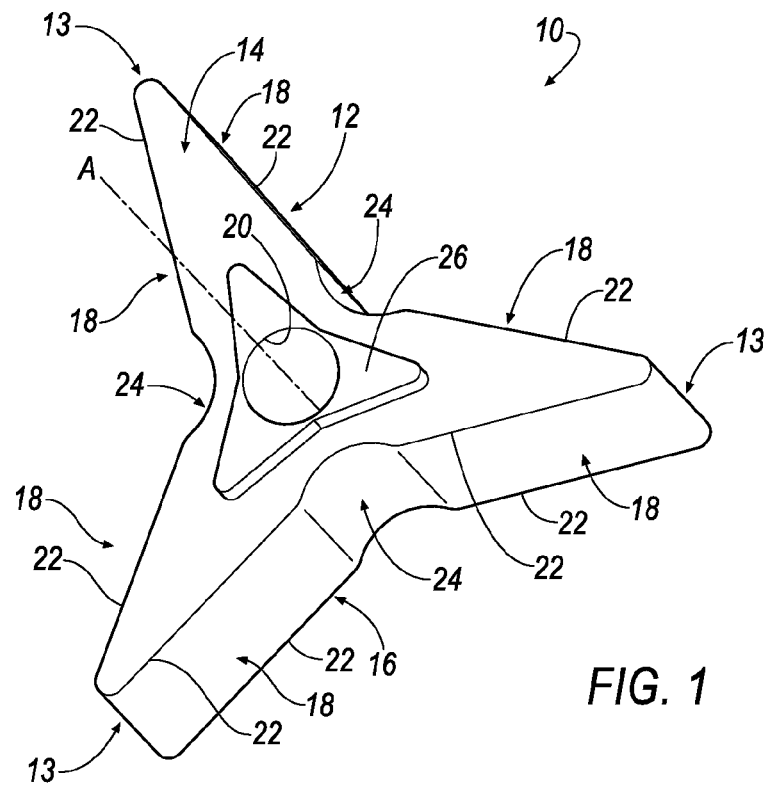
FIG. 1 is an isometric view of a triangular-shaped cutting insert in accordance with an aspect of the invention.
Figure 2:
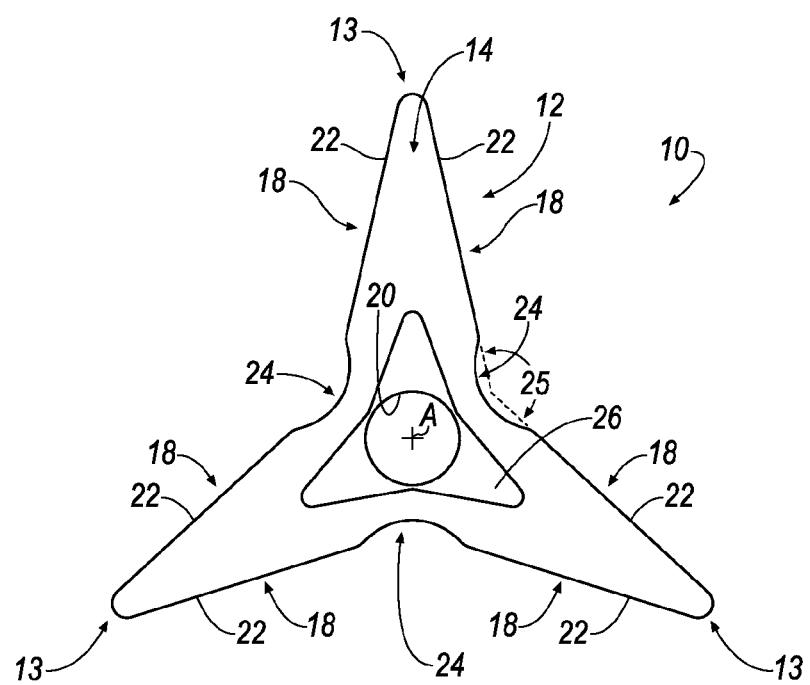
FIG. 2 is a top view of the triangular-shaped cutting insert shown in FIG. 1 in accordance with an aspect of the invention.
Figure 3:
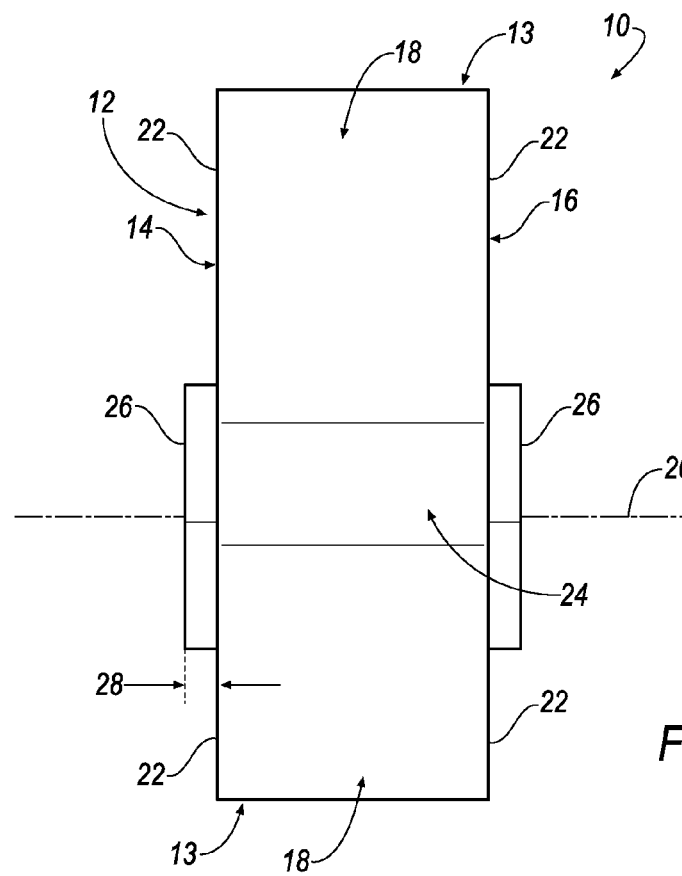
FIG. 3 is a side view of the triangular-shaped cutting insert shown in FIG. 1 in accordance with an aspect of the invention.

Referring now to FIGS. 1-3, a cutting insert is shown generally at 10 according to an embodiment of the invention. In general, the cutting insert 10 is double-sided having a generally triangular-shaped body 12 with a central axis, A, (i.e., parallel to the z-axis) extending therethrough. In the illustrated embodiment, the cutting insert 10 is generally triangular in shape with three vertices 13. The body 12 has an upper face 14, a lower face 16, and a plurality of substantially planar flank faces 18 perpendicular to and joining the upper and lower faces 14, 16. In the illustrated embodiment, the cutting insert 10 includes a total of six (6) planar flank faces 18. The lower face 16 is substantially identical to the upper face 14, and therefore only the upper face 14 is described herein for brevity. However, it should be appreciated that any discussion herein regarding the upper face 14 applies to the lower face 16. For the specific embodiment shown in the figures, a central aperture 20 is provided through the insert 10 for retention of the insert within a tool holder 100.

Figure 5:
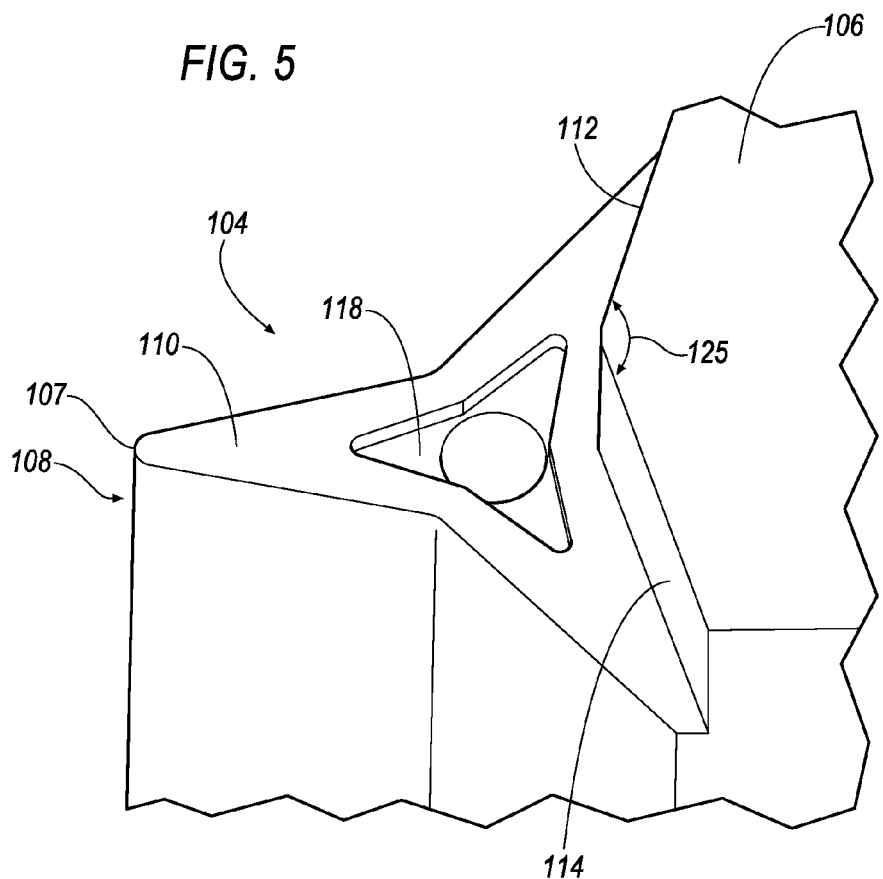
FIG. 5 is an enlarged view of a triangular-shaped insert-receiving pocket of the tool holder of FIG. 4.
Figure 6:
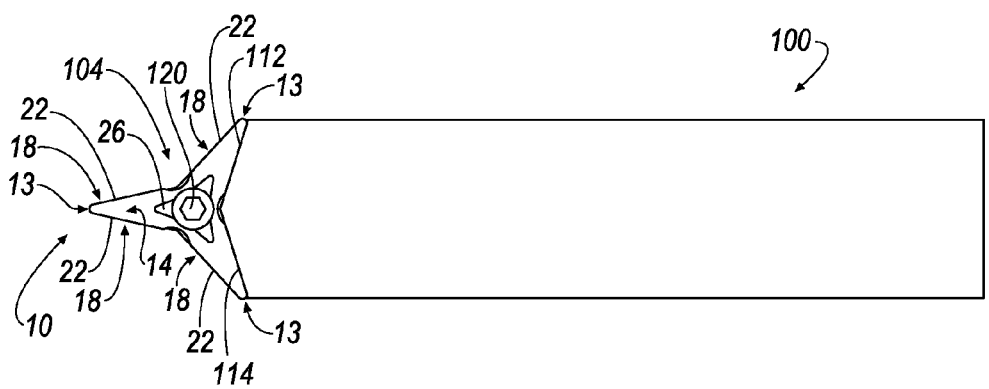
FIG. 6 is a top view of the triangular-shaped cutting insert of FIG. 1 mounted in the triangular-shaped insert-receiving pocket of the tool holder of FIG. 4.

The cutting insert 10 includes cutting edges 22 at the intersection between the upper and lower faces 14, 16 and each of the planar flank faces 18. Thus, the cutting insert 10 has a total of twelve (12) cutting edges 22, thereby providing the benefit of a large number of cutting edges per insert. Adjacent flank faces 18 (i.e. on the same side of the cutting insert 10) are separated by a constriction or setback 24 with a generally concave shape. In addition, adjacent flank faces 18 form an angle 25 of between about 165 degrees to about 150 degrees with respect to each other. The cutting insert 10 may include a central aperture 20 for accommodating a mounting bolt 120 for mounting the cutting insert in an insert-receiving pocket 104 (FIGS. 5 and 6).

The upper and lower faces 14, 16 of the cutting insert 10 also includes an island 26 surrounding the central axis A of the cutting insert 10. The island 26 is generally triangular in shape, similar to the general triangular shape of the cutting insert 10. The island 26 is higher in elevation than the upper and lower faces 14, 16 by a distance 28 so as to act as a locating seating surface and anti-rotation feature for the cutting insert 10, as described below.

Figure 4:
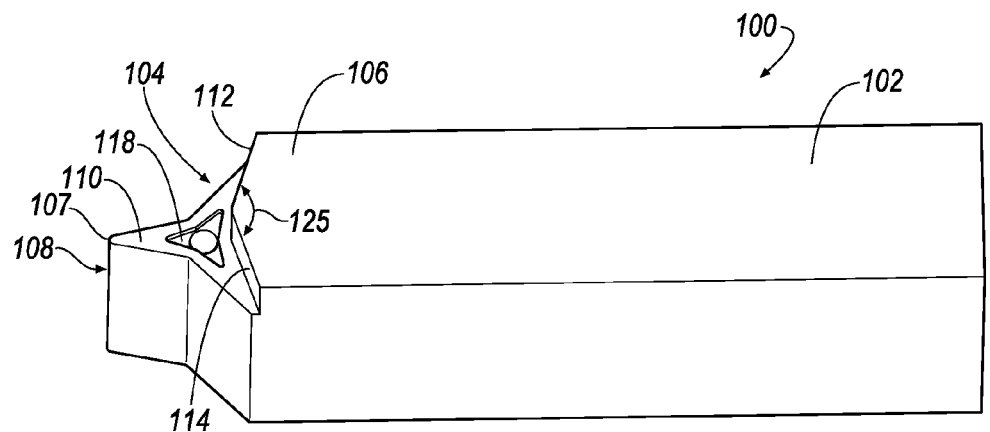
FIG. 4 is an isometric view of a tool holder in accordance with an aspect of the invention.

Referring back to FIGS. 4 and 5, a tool holder 100 for accommodating the cutting insert 10 is shown according to an embodiment of the invention. The tool holder 100 comprises a tool holder body 102 having an generally triangular-shaped insert-receiving pocket 104 formed in its upper surface 106 at a corner 107 of its forward end portion 108. The insert receiving pocket 104 has a bottom 110 and angularly-disposed side walls 112, 114 forming an apex 116 at the intersection between the side walls 112, 114 formed at an angle 125 of between about 165 degrees to about 150 degrees. The angle 125 of the side walls 112, 114 is substantially identical to the angle 25 of the cutting insert 10.

In addition, the bottom 110 of the insert-receiving pocket 104 includes a generally triangular-shaped recess 118 that is substantially identical in shape to the generally triangular-shaped island 26 of the cutting insert 10. The recess 118 has depth that is equal to or greater than the distance 28 in elevation of the island 26 with respect to the upper and lower faces 14, 16 of the cutting insert 10 so that the cutting insert 10 can be properly seated in the pocket 104.

Figure 7:
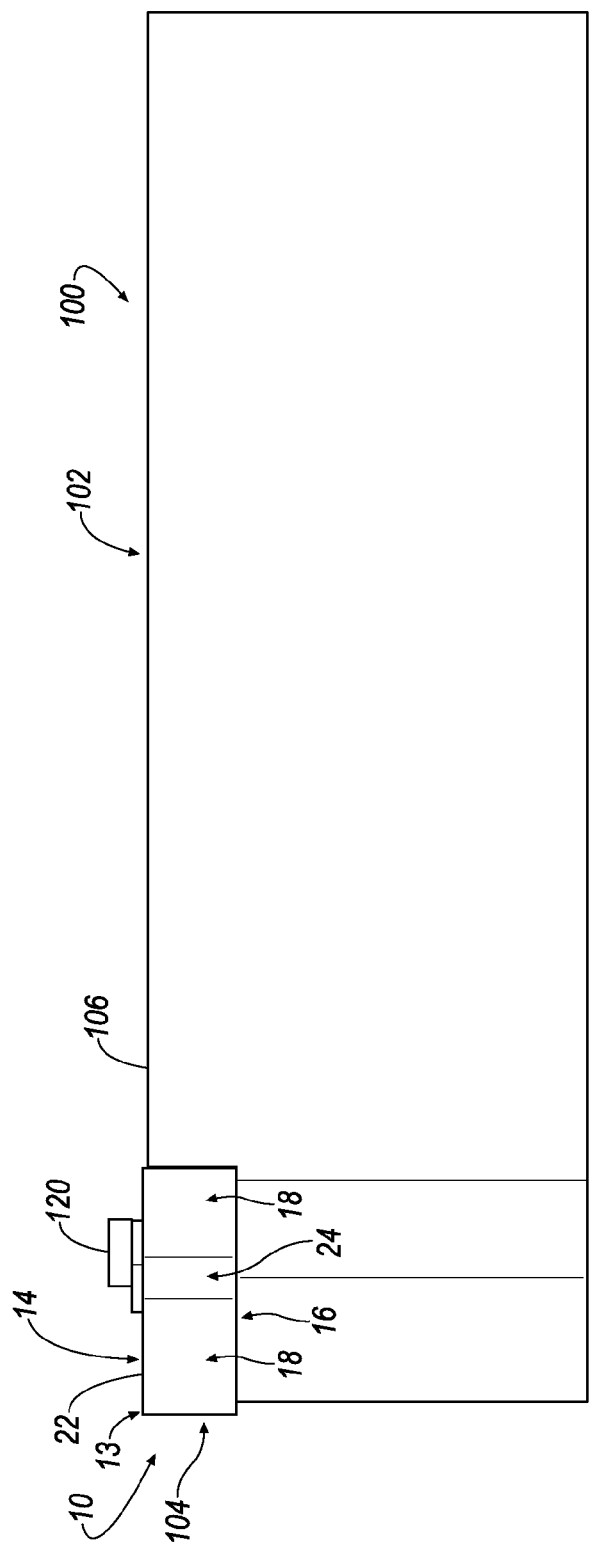
FIG. 7 is a side view of the triangular-shaped cutting insert of FIG. 1 mounted in the triangular-shaped insert-receiving pocket of the tool holder of FIG. 4.

FIGS. 6 and 7 shown the cutting insert 10 mounted in the tool holder 100. The cutting insert 10 can be mounted in the tool holder 100 by using a clamping bolt 120, or similar clamping means known in the art. It should be appreciated that the interaction of the island 26 with the recess 118 helps prevent rotation of the cutting insert 10 when mounted in the tool holder 100. Further, the combination of the island 26 and the recess 118 aids in properly locating the cutting insert 10 in the insert-receiving pocket 104. In addition, it should also be appreciated that, in addition to the interaction of the island 26 with the recess 118, two adjacent planar flank faces 18 of the cutting insert 10 engage the side walls 112, 114, thereby providing additional assistance in preventing rotation of the cutting insert 10 when mounted in the insert-receiving pocket 104. Further, the setback 24 between adjacent flank faces 18 of the cutting insert 10 provides clearance at the apex of the side walls 112, 114 of the insert-receiving pocket 104.

As described above, the generally triangular-shaped cutting insert 10 of the invention provides a total of twelve (12) cutting edges 22, thereby providing a large number of cutting edges per insert. In addition, it has been found that the interaction of the specific triangular shape of the island 26 of the cutting insert 10 with the substantially identical triangular-shaped recess 118 in the insert-receiving pocket 104 of the tool holder 100 provides a superior locating feature, as well as provides a superior anti-rotation feature when mounted in the tool holder 100.

The patents and publications referred to herein are hereby incorporated by reference.

Having described presently preferred embodiments the invention may be otherwise embodied within the scope of the appended claims.

What is claimed is:

1. A generally triangular-shaped cutting insert, comprising:
    a body having three vertices, an upper face, a lower face, and six planar flank faces joining the upper and lower faces;
    a cutting edge at an intersection between the upper and lower faces and each of the planar flank faces; and
    a generally triangular-shaped island surrounding a central axis of the cutting insert,
    wherein the island comprises three sides which are each non-straight, and which do not fully run in parallel with respect to the flank faces,
    wherein the body comprises three leg portions, each leg portion being defined by two of the flank faces converging toward a corresponding one of the vertices,
    wherein, for each leg portion:
        the upper face defines a surface area between the two flank faces which converge toward a corresponding vertex; and
        the island covers a minority of the defined surface area, and
    wherein the island is higher in elevation than the upper face;
    wherein adjacent flank faces are separated by a curved concave-shaped setback; and
    wherein the shape of an outer contour formed by the sides of the island differs from the shape of an outer contour of the body by not including a concave curve.

2. The cutting insert of claim 1, wherein adjacent flank faces form an angle of between about 165 degrees to about 150 degrees with respect to each other.

3. A tool holder comprising a tool holder body having a generally triangular-shaped insert-receiving pocket with the cutting insert of claim 1 mounted therein.

4. The cutting insert of claim 1, wherein the island comprises three vertices.

5. The cutting insert of claim 4, wherein:
    each of the three vertices of the body lies on a corresponding radius extending from the central axis; and
    each of the three vertices of the island also lies on a corresponding one of the three radii.

6. The cutting insert of claim 5, wherein the three radii are uniformly offset from one another with respect to the central axis.

7. The cutting insert of claim 1, wherein each side of the island comprises two adjacent straight portions which form an obtuse, non-straight angle with respect to one another.

8. The cutting insert of claim 1, wherein the island is higher in elevation than the lower face.

9. A combination cutting insert and tool holder, comprising:
a generally triangular-shaped cutting insert comprising:
a body having three vertices, an upper face, a lower face, and six planar flank faces perpendicular to and joining the upper and lower faces;
a cutting edge at an intersection between the upper and lower faces and each of the planar flank faces; and
a generally triangular-shaped island surrounding a central axis of the cutting insert, wherein the island comprises three sides which are each non-straight, and which do not fully run in parallel with respect to the flank faces;
wherein the body comprises three leg portions, each leg portion being defined by two of the flank faces converging toward a corresponding one of the vertices,
wherein, for each leg portion:
the upper face defines a surface area between the two flank faces which converge toward a corresponding vertex; and
the island covers a minority of the defined surface area, and
wherein the island is higher in elevation than the upper face; and
wherein adjacent flank faces are separated by a curved concave-shaped setback; and
wherein the shape of an outer contour formed by the sides of the island differs from the shape of an outer contour of the body by not including a concave curve;
a tool holder, comprising:
a tool holder body having a generally triangular-shaped insert-receiving pocket for accommodating the cutting insert, the insert-receiving pocket including a generally triangular-shaped recess that is substantially identical in shape to the generally triangular-shaped island of the cutting insert, wherein the island of the cutting insert interacts with the recess of the insert-receiving pocket of the tool holder to properly locate and prevent rotation of the cutting insert when mounted in the tool holder.

10. The combination of claim 9, wherein adjacent flank faces form an angle of between about 165 degrees to about 150 degrees with respect to each other.

11. The combination of claim 9, wherein:
the island comprises three vertices;
each of the three vertices of the body lies on a corresponding radius extending from the central axis; and
each of the three vertices of the island also lies on a corresponding one of the three radii.

12. The combination of claim 11, wherein the island is higher in elevation than the lower face.

13. A cutting insert comprising:
a body having three vertices, an upper face, a lower face, and flank faces joining the upper and lower faces;
a cutting edge at an intersection between the upper face and the flank faces; and
a generally triangular-shaped island surrounding a central axis of the cutting insert,
wherein the island comprises three sides which are each non-straight, and which do not fully run in parallel with respect to the flank faces,
wherein the body comprises three leg portions, each leg portion being defined by two of the flank faces converging toward a corresponding one of the vertices,
wherein, for each leg portion:
the upper face defines a surface area between the two flank faces which converge toward a corresponding vertex; and
the island covers a minority of the defined surface area, and
wherein the island is higher in elevation than at least one portion of the upper face;
wherein adjacent flank faces are separated by a curved concave-shaped setback; and
wherein the shape of an outer contour formed by the sides of the island differs from the shape of an outer contour of the body by not including a concave curve.

14. The cutting insert of claim 13, wherein the island comprises three vertices.

15. The cutting insert of claim 14, wherein:
each of the three vertices of the body lies on a corresponding radius extending from the central axis; and
each of the three vertices of the island also lies on a corresponding one of the three radii.

16. The cutting insert of claim 15, wherein the three radii are uniformly offset from one another with respect to the central axis.

17. The cutting insert of claim 13, wherein each side of the island comprises two straight portions which form an obtuse, non-straight angle with respect to one another.

18. The cutting insert of claim 13, wherein:
the flank faces comprise planar flank faces;
the body comprises three sides, each of the sides including two of the flank faces; and
at each of the sides of the body, the two flank faces form an obtuse, non-straight angle with respect to one another.

* * * * *